Nov. 3, 1953  R. C. ZEIDLER  2,657,732
METHOD AND APPARATUS FOR ADJUSTING CLUTCH RELEASE LEVERS
Filed March 24, 1948  2 Sheets-Sheet 1
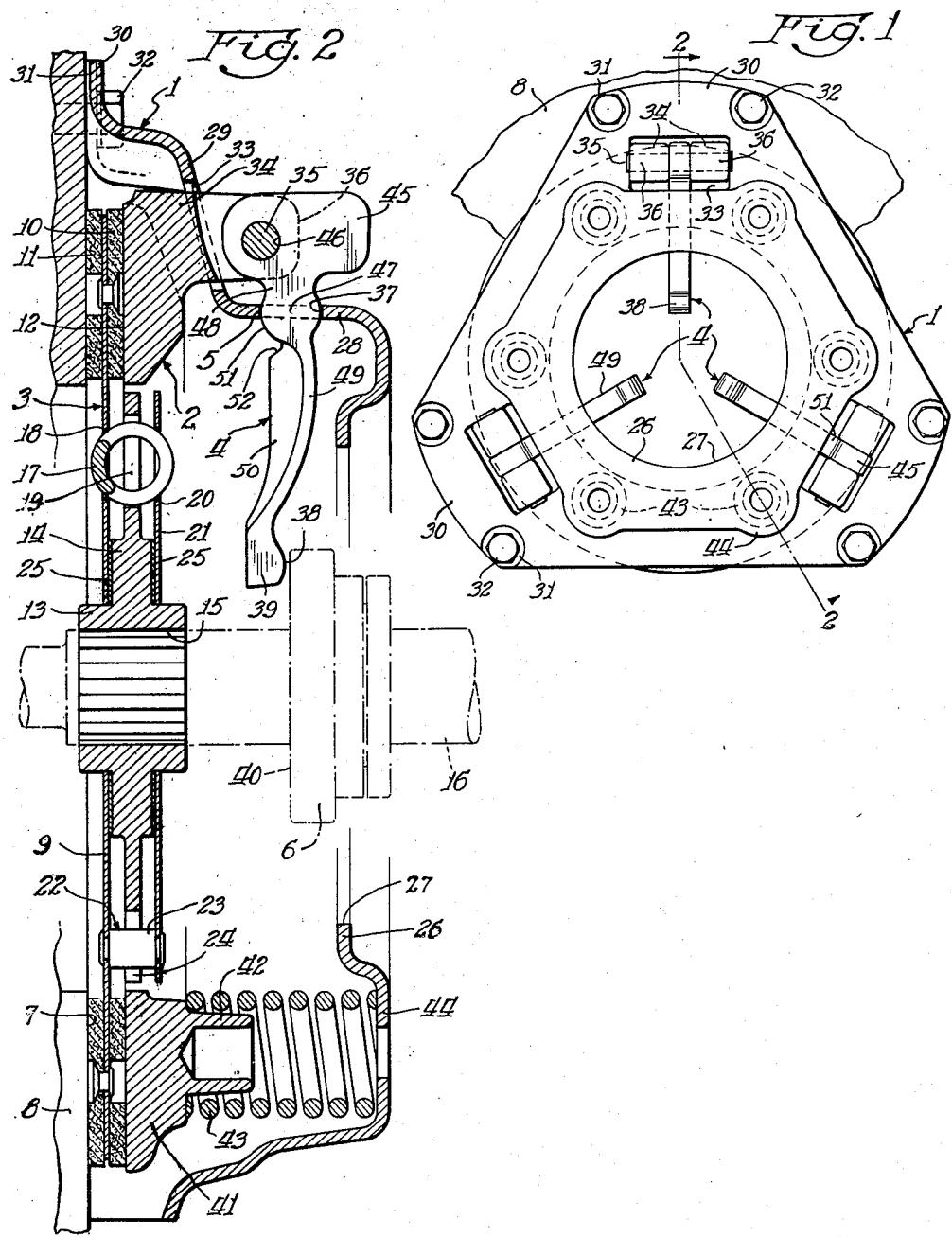
Inventor:
Reinhold C. Zeidler Nov. 3, 1953 R. C. ZEIDLER 2,657,732
METHOD AND APPARATUS FOR ADJUSTING CLUTCH RELEASE LEVERS
Filed March 24, 1948 2 Sheets-Sheet 2
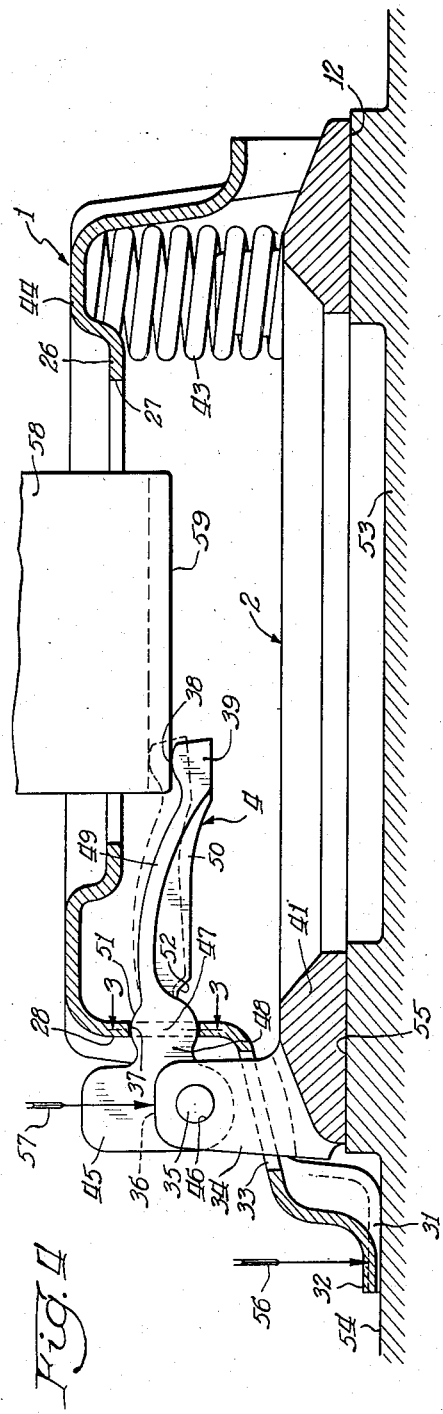
Inventor:
Reinhold C. Zeidler Patented Nov. 3, 1953

2,657,732

UNITED STATES PATENT OFFICE 2,657,732

METHOD AND APPARATUS FOR ADJUSTING CLUTCH RELEASE LEVERS

Reinhold C. Zeidler, Detroit, Mich., assignor to Borg-Warner Corporation, Chicago, Ill., a corporation of Illinois Application March 24, 1948, Serial No. 16,831

5 Claims. (Cl. 153—48)

1

This invention relates to improvements in friction type clutches such as are used in automotive vehicles, and more particularly is directed to apparatus for and a method of predetermining, adjusting, or setting the operative position of the control or release levers of such clutches.

The long or inner ends of such levers are usually contacted by, or connected to, a collar or release bearing, the latter of which may be actuated by automatic means or by a clutch pedal, through appropriate linkage mechanism, to cause the levers to shift a pressure plate relative to a flywheel structure to clamp or frictionally engage a clutch disc (carrying friction facings) between said plate and the flywheel. Such an arrangement is common in the prior art, and the invention herein disclosed is applicable thereto.

The ends of the levers which are engageable with the release bearing, above referred to, are generally identified as the lever tips and in all ordinary clutches it is necessary to predetermine, within practical operating limits, the positions of such tips for engagement by the release bearing. The careful positioning of these lever tips is desirable in order that the outer planar surface of the pressure plate will be maintained in a plane parallel to the inner planar face of the flywheel to provide a well balanced assembly, and wherein the clutch disc may be more efficiently controlled and excessive wear and deterioration prevented.

Heretofore various means, including screws, bolts, and shims have been employed to make the clutch levers adjustable. Such adjustments are generally made on an assembly fixture on which the individual components of the clutch are assembled, after which the clutch is compressed to its operating position at which the levers are adjusted, and each checked for "height" at its tip with a micrometer dial indicator or other convenient means. The levers must be adjusted for each assembly and are preferably adjusted so that the contacting faces or points of the tips are disposed in a plane, although, as a practical matter, it is not considered objectionable if they are held within an axial distance of .010 to .030 of an inch. Heretofore, various means have been used to lock or retain the adjustable means so that the position of the levers will not change during operation. Generally after the initial adjustment and such lock-

2 ing, the levers are again tested for height in an effort to make certain that the manufacturing operations have not disturbed the adjustment and to take such steps as are possible to make sure that continued operation of the levers will not release or disturb the adjustment. Such adjustments are time consuming and difficult and when parts are displaced or out of order, the clutch assembly is out of alignment and balance with the result that the clutch assembly will not operate satisfactorily.

Clutch operating levers are usually constructed of steel or malleable iron having known characteristics. They may be stampings, forgings or castings, and their ratios usually lie between 3 to 1 and 7 to 1. Since only a small space is available, it generally results in the use of levers in which the maximum bending stress is concentrated at or adjacent to the fulcrum provided by the cover member.

By utilizing this fact and the physical characteristics of the metal used in the levers I have accomplished one of the important objects of this invention, which is to design and construct the levers in a manner whereby the position of the lever tips can be predetermined by bending or distorting the levers somewhat in excess of their elastic properties so that they will take a decided set, closely enough in plane so the operation of the clutch is not impaired.

One of the important objects of the subject invention is to simplify the design and reduce costs in manufacture and assembly. In this connection, it is an object to eliminate all of the extra parts or elements usually required to make the levers adjustable.

Another object of the invention is to reduce to a minimum the time, effort, and skill customarily required to adjust, set, or predetermine the operative positions of such levers.

A particular object of the invention is to provide a unique method whereby the position of the lever tips engageable with the release bearing are all made to lie substantially in a single plane by distorting or bending the levers to a point where they will take a set, such point generally being reached when the distortion exceeds the elastic limit of the material of which the levers are made.

An additional object of the invention is to design and construct each of the levers with an intermediate weakened portion at or adjacent to its normal critical section so that under a bending load higher than encountered in normal operation the stress at such weakened portion or section will exceed the elastic limit of the material to cause a substantially permanent deformation of the lever. Thus, the levers may all be bent to a predetermined dimension causing simultaneous permanent deformation at such portions, the strength of such portions being sufficient to carry all normal operating loads and at the same time avoid taking any additional permanent set. It is to be understood that the term "weakened" may apply either to a lever of substantially uniform cross-section having an opening therein to weaken the structure at an appropriate location or one provided with an intermediate restricted portion, or some other desirable arrangement. It will therefor be manifest that the weakened portions can all be made identical and held to relatively close limits so that the sets resulting from the distortion will be uniform. The levers may be constructed from any suitable material for the purpose, but that proven most desirable is low carbon steel of S. A. E. 1010 or 1020 analysis subjected to a cyanide case hardening treatment, as it has great ductility and a high elongation factor.

Many other objects and advantages of the invention will become apparent after considering the description hereinafter set forth in conjunction with the drawings annexed hereto.

In the drawings, wherein identical parts of the structure are identified by the same reference characters:

Fig. 1 is an end view in elevation of a cover and pressure plate assembly illustrative of a device to which the present invention is directed;

Fig. 2 is an enlarged transverse sectional view of such assembly taken substantially on line 2—2 of Fig. 1 and looking in the direction of the arrows;

Fig. 3 is a transverse sectional view of a lever taken on line 3—3 of Fig. 4; and Fig. 4 illustrates a fixture upon which the cover plate assembly is mounted, including means for simultaneously setting the position of the lever tips.

The preferred assembly embodying the improved principles of design, construction, and method constituting the invention includes a cover or housing 1, a pressure plate 2 disposed in the cover, a clutch friction disc subassembly 3, and a plurality of levers 4 which are operatively connected to the pressure plate and fulcrumed on the cover at bearing points 5 in a manner whereby a release bearing 6, operable by a clutch pedal, will actuate the levers to control the movement of the plate and disc with respect to the planar face 7 of a flywheel 8 to transmit power from the flywheel to a transmission shaft or the like, as desired.

The friction disc subassembly 3 may be of conventional design and as shown comprises a metal disc 9 having fixedly secured to its outer marginal zone inner and outer friction elements 10 and 11 which, as clearly illustrated, are located between and operatively engageable with the planar surface 7 of the flywheel and a planar face 12 of the pressure plate. The disc 9 is mounted on a hub 13 which may have an integrally formed radial flange 14. The hub, as shown, is spline connected as at 15 to a driven shaft 16.

A vibration dampening structure, corresponding for example, to the one described in United States Letters Patent No. 2,042,570, is associated with the disc 9 and the flange 14 of the present structure to provide a flexible driving connection between them. For this purpose the disc and hub may be connected by an arrangement in the form of an annulus of coiled springs 17 located in aligned openings 18, 19 and 20 in the disc, flange, and a washer 21. The disc and washer are preferably secured together for simultaneous movement by means of long spacers 22, having reduced ends which extend through holes provided therefor in these members and are upset as shown in Fig. 2. The spaces also include enlarged cylindrical portions 23, which extend through notches 24 interrupting the periphery of the radial flange 14 and serve to connect and maintain the disc and washer in spaced parallel relationship, the size of the notches and cylindrical portions of the rivets being such that relative movement may take place between the disc and washer as a unit and the hub. This relative movement may be controlled and dampened in some measure by friction materials 25 disposed between the hub flange, disc and washer. Driving forces are transmitted from the disc to the hub and vice versa through the conventional coil springs or dampeners 17.

It will be observed that the aligned openings in the disc and washer may have radial dimensions less than the diameter of the springs so that the springs will be held in proper operative positions.

The cover may be constructed as desired, but as herein illustrated is preferably fashioned to impart stability and made generally triangular in shape. It includes, among other things, an inset flat wall portion 26 provided with a relatively large central round opening 27 for the release bearing and shaft 16 carrying the bearing. The cover as shown also includes at least three generally axial wall portions 28, outwardly extending inclined wall portions 29, and an outwardly extending radial border flange 30 joined to the inclined walls. The border flange 30 is continuous and formed to provide a pair of apertured flat land portions 31 adjacent each corner extremity of the cover, which lands are normally disposed in a single plane and firmly anchored against the planar face 7 of the flywheel by any convenient means, such as screws 32 (Fig. 2). These lands also serve an additional purpose which will be referred to later.

Each of the inclined wall portions 29 is provided with a rectangular axial clearance opening 33 through which three rearwardly extending lugs 34 integral with the pressure plate project. The extremities of the lugs are bifurcated and provide rigid supports for the semi-centrifugal levers, which are pivotally mounted in the bifurcations by pivots 35. The ends of the lugs are preferably made flat as indicated at 36 and disposed in a single plane for a purpose to be described subsequently. The levers are constructed to project through square radial openings 37 provided in the axial wall portions 28 so that the inner contact surface or points 38 on the tips or ends 39 of the levers are located in the cover for engagement with the planar bearing surface 40 of the release bearing. Attention is directed to the fact that the forward marginal edge of each opening 37 constitutes one of the fulcrum bearing points 5 above referred to.

The pressure plate 2 includes a ring or annular portion 41 having the planar face 12 which is engageable with the inner friction element 10 carried by disc 9 above referred to. The annular portion is preferably formed with six equally spaced rearwardly extending studs 42, between which the three lever supporting lugs 34 are equally spaced circumferentially for balance. Each of the studs 42 provides a holding support for one end of a longitudinally extending helical spring 43, and the cover is provided with pockets or recesses 44 which receive the opposite ends of the springs. These springs are identical and function to urge the cover and pressure plate in opposite directions so that the outer and inner friction elements 11 and 10 on the disc are respectively normally held in intimate contact with the planar faces 7 and 12 of the flywheel and pressure plate. Levers shown are of the semi-centrifugal type, wherein an enlarged outer portion 45 of the lever acts centrifugally against the pressure plate 2 to supplement the normal pressure of springs 43 to give increased torque capacity of clutch with increase in engine speed. To accomplish this, the reaction of lever is taken by the cover stamping at the rear-most edge of opening 37 opposite edge 5, the opening 37 being about .003 of an inch greater than the diameter of the lever at 47, so when clutch is released, loading is taken on surface 5; and when it is engaged, the centrifugal reaction is taken at the edge opposite from 5. The .003 clearance eliminates any chance of binding.

The arrangement is such that when the clutch pedal is depressed by an operator, the planar face 40 of the release bearing 6 will forcibly engage the contact points 38 on the lever tips 39 to cause tilting of the levers to retract or move the pressure plate rearwardly against the resistance of the springs 43, so that the outer friction element will disengage the operating face of the flywheel to throw out the clutch. It is important that all of the planar surfaces, faces, and points above referred to are disposed in planes at right angles to the longitudinal axis of the complete assembly, and particularly that the axial distance between the planar faces on the flywheel and pressure plate, and the axial distance between the plane formed by the contact points 38 on the lever tips and the planar face 40 on the release bearing, be accurately predetermined and maintained to obtain a well balanced operating assembly. It is also desirable that the fulcrum bearing points 5 on the cover for the levers 4 be substantial and they should be located in predetermined positions.

The levers 4 are preferably forged, and each is more or less T-shaped in design, sturdy in construction, and includes a head portion 45 provided with a transverse hole 46 through which the pivot 35 extends, a lateral bearing portion 47 connected to the head by a neck portion 48, a curved arm portion 49, and the tip 39 which preferably is offset with respect to the arm portion. The arm portion is preferably reenforced throughout its length by an integral generally tapered rib portion 50 to impart rigidity to the lever. The junctions between all of the portions just referred to are rounded in order to promote strength and avoid fracture, and the material adjacent the neck portion 48 is preferably rigid.

The bearing portion 47 of each lever is generally square in cross-section as depicted in Fig. 3 and provided with a substantially convex bearing face 51. Although not absolutely essential, it is generally desirable that the center point of the hole 46, the fulcrum bearing point 5, and the center point of the tip 39 be arranged substantially in alignment. The object in having the center of the hole 46 in the lever in plane with the bearing edge 5 is to promote a true rolling contact between the lever and the bearing edge without sliding or scrubbing on the surface of the cover. Having a rolling contact reduces wear and makes it practical to use a high-unit pressure on the soft steel required to form the cover stamping. The arrangement of having the lever fulcrum directly in the side wall of the cover eliminates the usual extra parts, such as, yokes, pins, rollers, and screws, thus permitting a low-cost design. The convex face 51 on the bearing portion and the contact surface 38 on the tip are preferably coined smooth and square with the sides of the lever.

As set forth above, important objects of the invention are to provide a lever embodying improved principles of design and construction, apparatus, and unique method for predetermining or setting the location of the levers in operative position. With this end in view the rib portion 50 of each lever is preferably provided with an interruption in the form of a V-shaped notch 52 in the wide portion of the rib adjacent to the bearing portion 47. The interruption may be shaped and located as desired, and it is to be understood that the lever may be provided with an intermediate restricted portion formed by the notch or may be otherwise weakened such, for example, as by providing a hole in the rib.

Sufficient apparatus to practice the method of setting the levers is exemplified in Fig. 4 wherein 53 represents a fixture in the form of a base block provided with a planar supporting surface 54 and an elevated annular boss portion provided with a planar supporting surface 55 parallel to the surface 54. The cover 1, pressure plate 2, and levers 4 and springs 43 are assembled as illustrated and then mounted on the fixture so that the pairs of land portions 31 adjacent the corner extremities of the cover engage the supporting surface 54 and the planar surface 12 of the pressure plate engages the elevated annular supporting surface 55. Attention is directed to the fact that the axial distance between these supporting surfaces is equal to the axial distance between the planar face 7 of the flywheel and the planar face 12 of the pressure plate; thus the height of the boss portion compensates for the space occurring between the flywheel and pressure plate under normal operating conditions. With the parts so engaged, air operated pressure clamps (not shown) simultaneously hold the land portions of the cover down tightly against the surface 54 as indicated by the directional arrow 56, and preferably three other air operated clamps, not shown, simultaneously engage the flat ends 36 of the pressure plate lever supporting lugs 34 to hold the planar face 12 of the plate down tightly against the elevated supporting surface 55 with force, as indicated by arrow 57, at least three times the cumulative force exertable by the tensioned helical springs 43. With the parts so held, an additional air operated ram or plunger 58 provided with a planar abutting surface 59, parallel to surfaces 54 and 55, is projected into the opening 27 in the inset wall 26 of the cover to forcibly engage the contact surfaces or points 38 of the levers to deflect and distort the levers from the dotted line position to the full line position as shown in Fig.

4, which is the adjusted normal operating position.

In order to insure uniform results, it has proven desirable to hold the levers to the full line adjusted position, just referred to, for a period of approximately 3 seconds, whereby to allow sufficient time for the material of the lever at the critical point to exceed positively the elastic limit and set.

Obviously, the assembly fixture could have the air clamps and ram operated by a single valve so that the first movement of the valve handle would cause the cover border flange and pressure plate lugs to be held while additional movement would cause the ram to do its work. Also, an automatic timer could be advantageously associated with the valve structure.

In running deflection and set computations on levers of the type illustrated, it was discovered that after passing through the yield point of the material the stress was proportional to the strain applied to the lever through a considerable range; that by plotting the corresponding permanent set against the deflection of the lever, the permanent set and deflection was proportional; and that the set when once made permanent would hold until the ultimate strength of the material is reached. These results, however, will not hold true at any point below the yield point, because according to "Hookes law" the proportionality of stress to strain holds true only up to the proportional elastic limit. It will therefore be manifest that in order to set the levers any appreciable amount, in accordance with the invention, it is necessary to go beyond the yield point. Thus, due to this proportionality, it is possible to set a series of levers that may be out of plane into a single plane, within certain practical limits, by one controlled bending operation.

If a series of such levers being out of plane are deflected to a given dimension, the out of plane, after the deflecting means has been removed, would be considerably less than originally. This is because the lever highest from the supporting face 54 of the fixture will take a greater permanent set due to having been deflected more than the lever that was lowest and any lever in between will take a permanent set somewhere between the highest and lowest lever. It has also been discovered that with a given design of lever and type of material, a deflection of between .080 and .150 of an inch gave the best correction for out of plane. As a corrective deflection drops to less than .080 of an inch, the reaction of the lever to taking a permanent set usually becomes unreliable.

Production tolerances, where a series of levers are to be set at one time, will depend on what permissible final out of plane is allowable. If, for example, the final result is to be within .005 of an inch, the maximum out of plane originally should not be over .030 of an inch. If a greater tolerance on the final out of plane is allowable, production tolerances on the manufactured parts can be varied accordingly.

As stated above, the object of the notch 52 is to deliberately weaken the lever adjacent the bearing portion 47 so that when the lever is stressed beyond its elastic limit, to modify its molecular characteristics, a permanent set or deformation will take place only at this localized section. This arrangement is most advantageous because the cross-sectional area can be held to closer limits or dimensions at a localized point than throughout the length of the lever, and the resulting uniformity of the set will be closer. The levers described are preferably adapted for use in 8 and 8½ inch size clutches and with the proper spring load necessary to transmit the torque of engines with which they may be used, the load on the lever tips will be approximately 100 pounds per lever. It has been proved that once the lever has been permanently set by applying a load or force of 200 pounds or more, no additional set takes place if a load of only 100 pounds is applied.

While I have illustrated the preferred application of the invention it is to be understood that many other modifications may be made without departing from the spirit of the invention, and I do not wish to be limited to the precise details of the construction set forth, but desire to avail myself of all changes within the scope of the appended claims.

I claim:

1. A method of setting the position of the inner operating ends of the levers in a clutch assembly, which consists in placing the assembly on a fixture to hold the levers against movement relative to the other parts of the assembly, and the other parts of the assembly against relative movement to maintain the levers and other parts of the assembly in fixed relation and then applying bending stress in an axial direction to the ends of the separate levers to simultaneously impart a permanent set to the levers with their ends all disposed in a common plane at substantially right angles to the longitudinal axis of the assembly.

2. The method of positioning in predetermined relationship the power-receiving radially inner ends of the operating levers of a clutch assembly which includes a pressure member in a cover and the radially outer regions of the levers fulcrum on the cover and are attached to the pressure member, said method comprising the steps of changing the original shape of the levers by applying pressure to the separate levers axially of the assembly to simultaneously distort them to a permanent condition at locations between the fulcrums and the inner extremities of the levers to thereby set the power-receiving ends of the levers in a substantially common plane.

3. A method of positioning the ends of a plurality of levers associated with a pressure plate and cover of a clutch in a predetermined relationship which consists in assembling the levers with a plate and cover, holding the pressure plate and levers against movement relative to the cover, and then applying sufficient pressure to simultaneously bend the levers in a direction axially of the pressure plate and cover to impart a permanent set to the levers so that their ends will remain in a substantially single plane when the pressure is released, the pressure applied to bend the levers being substantially greater than the pressure applied during operation of said levers to move the pressure plate during normal operation of the clutch.

4. A method of positioning in predetermined relationship the radially inner ends of a plurality of levers in a clutch which includes a pressure member in a cover and the radially outer regions of the levers fulcrum on the cover and are attached to the pressure member, said method comprising weakening a portion of each of the levers, holding the pressure member and cover against movement relative to each other, bending the levers simultaneously at their weakened portions to stress the weakened portions beyond the elastic limit of the material thereof to set the material and rectify possible error due to manufacturing variations and thereby position the levers in a predetermined manner relative to each other.

5. The method of positioning in predetermined relationship the radially inner extremities of the operating levers of a clutch assembly including two drive members connected to each other for conjoint rotation and relative axial movement and in which the levers are pivotally attached to one member and fulcrumed on the other member, said method comprising the steps of holding the drive members against relative axial movement, and applying forces to the radially inner extremities of the separate levers to simultaneously bend regions of said levers beyond their elastic limits with sufficient pressure to impart a permanent set to the levers and thereby position the radially inner extremities of the levers in a predetermined relationship with respect to each other.

REINHOLD C. ZEIDLER.

References Cited in the file of this patent

UNITED STATES PATENTS

| Number | Name | Date |
|---|---|---|
| 279,618 | Wells | June 19, 1883 |
| 1,568,583 | Anderson | Jan. 5, 1926 |
| 1,634,913 | Rainsford | July 5, 1927 |
| 1,925,804 | Hiering | Sept. 5, 1933 |
| 1,927,643 | Hughes | Sept. 19, 1933 |
| 1,962,797 | Wemp | June 12, 1934 |
| 2,195,354 | Bateman | Mar. 26, 1940 |
| 2,219,595 | Lang | Oct. 29, 1940 |
| 2,417,035 | Zeidler | Mar. 4, 1947 |

FOREIGN PATENTS

| Number | Country | Date |
|---|---|---|
| 194,363 | Great Britain | Mar. 5, 1923 |